June 19, 1934.  K. L. HERRMANN  1,963,407
ANTIFRICTION BEARING
Filed June 29, 1931  2 Sheets-Sheet 1

INVENTOR.
Karl L. Herrmann
BY
ATTORNEYS.

June 19, 1934.  K. L. HERRMANN  1,963,407
ANTIFRICTION BEARING
Filed June 29, 1931  2 Sheets-Sheet 2

INVENTOR.
Karl L. Herrmann
BY P. W. Pomeroy
ATTORNEYS.

Patented June 19, 1934

1,963,407

UNITED STATES PATENT OFFICE 1,963,407

ANTIFRICTION BEARING

Karl L. Herrmann, South Bend, Ind., assignor to The Bantam Ball Bearing Company, South Bend, Ind., a corporation of Indiana Application June 29, 1931, Serial No. 547,539

2 Claims. (Cl. 308—217)

This invention relates to anti-friction bearings and particularly to the retainer for the bearing rollers whereby the rollers are held in fixed relation to each other to facilitate the assembling or disassembling of the parts of the bearing and to permit of a greater number of rollers being used in a given sized bearing than is now used in bearings offered for sale, and is a continuation in part of my application Serial No. 494,059 filed November 7, 1930.

One of the objects is to provide a retainer having side rings and bars bridging the rings formed as one piece and adapted to receive the rollers between the respective side and bridge members.

Another object is to form a retainer having roller receiving openings therein in such a manner that the metal at the outer edges of the bridge or cross members can be swaged or forced between the respective rollers to prevent removal of the rollers from that side of the retainer.

A still further object is to form a retainer having side rings and bars bridging the rings formed as one piece in which the inner portions of the bars are extended to provide retaining means for the rollers to prevent removal of the rollers from the retainer.

A still further object is to provide a retainer of the class just described in which a space is provided in the bars to permit the insertion of lubricating material between the rollers and the bars.

A still further object is to provide an antifriction bearing comprising a plurality of rollers mounted in a retainer having side rings and openings cast therein to receive the rollers, the cross members or bridges between the side rings having lips formed thereon permitting that portion of the metal to be forced out of its normal position toward the rollers to prevent the rollers from dropping out of the openings at that side of the retainer.

The above being among the objects of the present invention, the same consists of certain mechanical details and combination of parts to be hereinafter described, and then claimed, having the above and other objects in view.

In the accompanying drawings which illustrate a suitable embodiment of the present invention, Figure 1 is a fragmentary side elevational view of the bearing.

Figure 1:
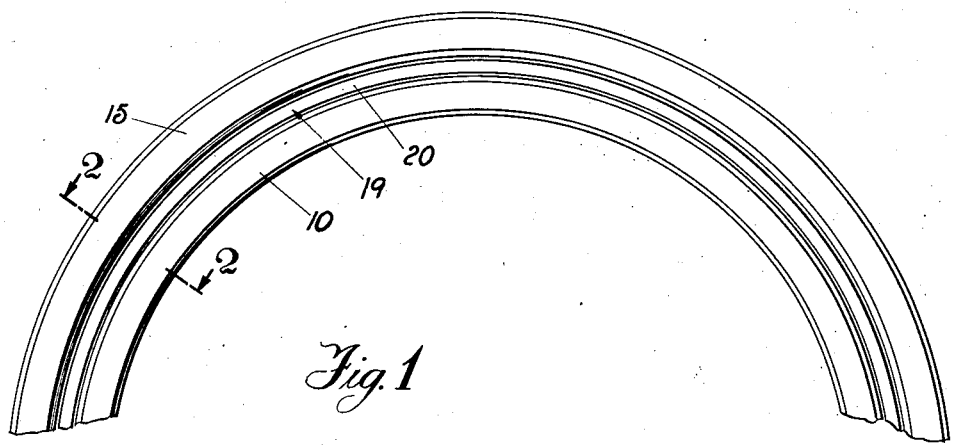
Figure 2:
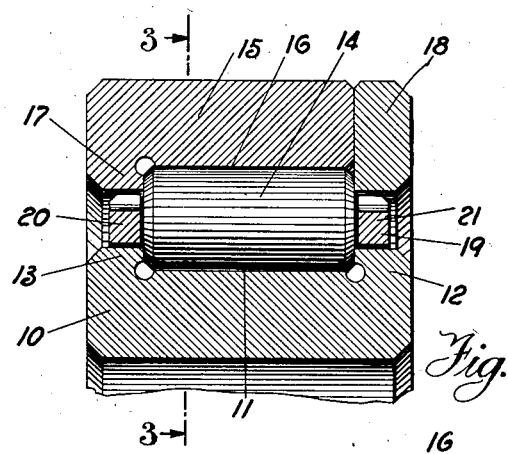
Figure 2 is an enlarged sectional view taken on the line 2—2 of Figure 1.

Referring to the drawings in which like numerals refer to like parts throughout the several views, the preferred form of anti-friction bearing comprises an inner race member 10 having a race way 11 formed therein and having flanges 12 and 13 adapted to prevent axial movement of the rollers 14 in the race way 11. An outer retainer 15 has a race way 16 formed therein against which the rollers 14 contact as is shown in Figure 2, the retainer 15 being provided with a flange 17 to prevent axial movement of the rollers in one direction. The bearing is also provided with a ring 18 adapted to contact with the ends of the rollers 14 opposite the flange 17 to prevent axial movement of the rollers 14 in that direction and also to provide a means for maintaining the bearing in assembled position, the ring 18 being secured to the outer bearing member 15 in any desired fashion.

Figure 4:
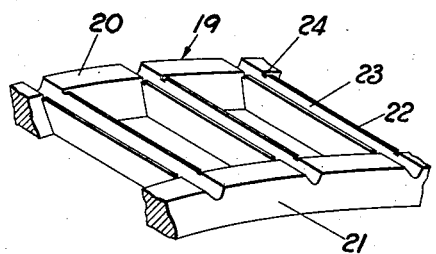
Figure 4 is a fragmentary perspective view showing the roller retaining member.

A roller retainer 19 is preferably cast from a soft metal such as brass, bronze or a white-metal and comprises side rings 20 and 21 and spacing bars or bridges 22. Grooves 23 are preferably formed in the outer faces of the bridges 22 either by casting or machining the same therein as illustrated in Figure 4. Notches or grooves 24 are then preferably machined in the upper faces of the bridge members 22 adjacent to the side rings 20 and 21 for a purpose to be presently described.

Figure 3:
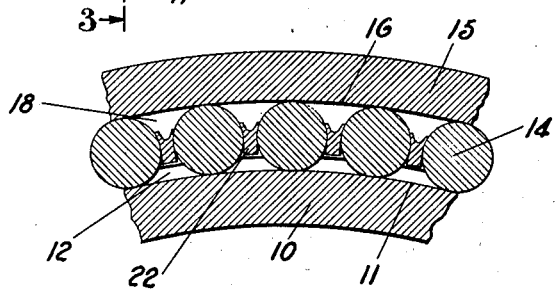
Figure 3 is a sectional view taken on the line 3—3 of Figure 2.
Figure 6:
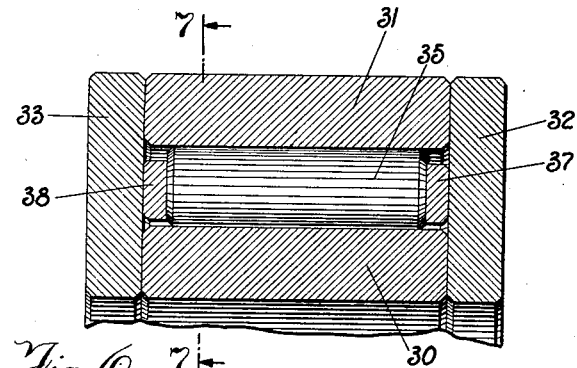
Figure 6 is a sectional view on the line 6—6 of Figure 5.

In assembling the bearing the roller retainer 19 is slipped over the inner race member 10 and the rollers 14 are inserted in the spaces between the bridge members 22 after which the metal at the outer edges of the bridge members 22 is forced outwardly by any suitable tool to the position shown in Figure 3, thus retaining the rollers in position in the retainer and in contact with the race way 11 formed in the inner race member 10.

It will thus be seen that when the rollers are inserted in the retainer and the metal is peened or forced out of its normal position, the parts just described are held in assembled position, as the rollers 14 are prevented from axial movement in their race way due to the flanges 12 and 13 formed on the inner race way member 10. After the rollers are assembled in the retainer as heretofore described, the outer race way 15 may be slipped over the rollers as shown in Figure 2, after which the ring 18 may be clamped to the race way 15 to form the complete assembly.

Heretofore it has been the common practice to provide roller retainers having outer ring members and long rivets extending between these ring members and between the side faces of the rollers assembled therein to provide a roller retaining means. It will be evident that such a construction is weak and undesirable as it has been found impractical to rivet the side rings together as there is always some relative movement between them and aside from the fact that the construction is not rigid and satisfactory, the time and labor necessary to assemble the retainer increases the cost materially over the present device. In the present device it has been found that by forming the retainer in one piece by casting the same as heretofore described, a much more rigid construction has been obtained and that the cross sectional area of the bridge members may be materially reduced to thereby permit of a greater number of rollers in a given diameter of bearing which will materially increase the life of the bearing and cause far less servicing of the bearing and which will permit an assembly which needs no attention after the respective parts are put together.

In the modified form of retainer illustrated in Figures 5 to 9 inclusive, I have also provided a roller bearing retainer in which a pair of spaced rings and a plurality of spaced cross members or bars between the rings are cast integrally.

Figure 7:
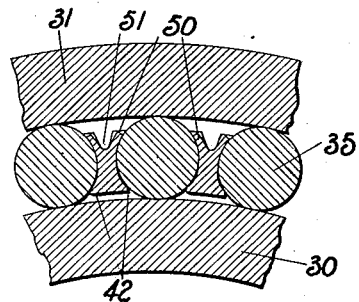
Figure 7 is a sectional view on the line 7—7 of Figure 6.

Referring to Figure 7, it will be seen that this bearing comprises an inner race member 30 in the form of a flat ring, an outer race member 31 also in the form of a flat ring having a greater diameter than and overlying the inner race member 30. Abutting against the edges of the inner and outer race members are a pair of thrust rings 32 and 33. These rings have an oblong section and a radial dimension equal to the distance from the inner surface of the inner race member to the outer surface of the outer race member and serve when urged against the race members to maintain the race members in radial alignment. Between the inner and outer race members are a plurality of bearing rollers 35 mounted in a novel retainer generally indicated at 36 in Figure 9.

This retainer comprises a pair of rings 37 and 38 spaced apart and held parallel to each other by a series of bridging members or cross bars 40 extending between the rings. These bridging members or cross bars 40 are equally spaced around the rings and are cast integrally therewith.

Figure 8:
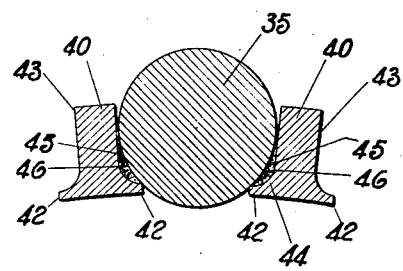
Figure 8 is a sectional view similar to that shown in Figure 7, but on an enlarged scale and showing the method of retaining lubricating material between the roller and the cross bar.

From an inspection of Figure 8, it will be observed that each of the cross members or bars 40 is provided at its inner side with a pair of outwardly extending flanges 42 which give a cross sectional view of the bar a shape in the form of an inverted T. It will also be observed that the adjacent flanges on two consecutive bars extend partly under the roller 35 and effectively prevent the roller from slipping between the bars toward the center of the bearing.

It will further be observed from Figure 8 that the bars 40 are provided with straight side portions 43 extending parallel to a radius of the bearing, and that these side portions for a portion of the length of the cross member or bar are connected with the extremities of the flanges 42 by a curve 44 having a radius much shorter than the radius of the roller 35, thereby leaving a space or pocket 45 between the cross member and the side of the roller in which lubricating material 46 such as oil soaked waste may be inserted.

Figure 9:
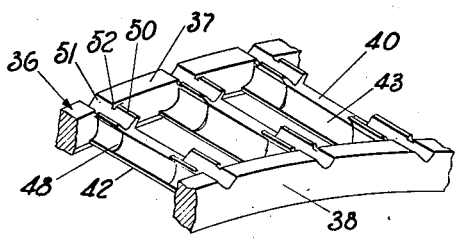
Figure 9 is a fragmentary perspective view showing the modified form of roller retaining member.
Figure 5:
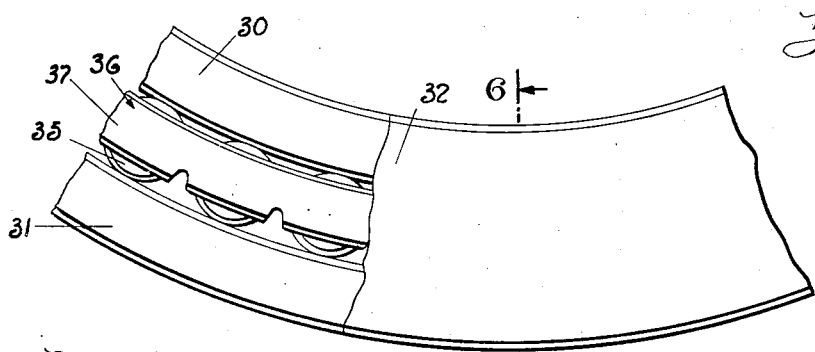
Figure 5 is a fragmentary side elevational view of a modified form of a bearing, certain parts being broken away to better illustrate the construction thereof.

As particularly shown in Figure 9, at the ends of the cross member the curves 48 between the side portions 43 and the extremity of the flange 39 are approximately the same radius as the radius of the roller bearing. From a further inspection of Figure 9, it will be observed that each cross member or bar 40 is provided adjacent its ends with a portion 50 having a trough-shaped groove 51 milled or cast therein and that this trough-shaped groove extends through the adjacent ring member. At the ends of the cross members 40 adjacent to the rings 37 and 38 notches 52 are milled in the portion 50.

From an inspection of Figure 7, it will be observed that after the rollers are inserted between the cross members 40, the edges of the portion 50 are swaged or bent over toward the adjacent rollers to restrain the rollers against removal from the retainer. It will be seen therefore that in the modified form of bearing illustrated in section in Figures 7 and 8, I have provided a retainer which prevents removal of the rollers through either side of the bearing, and also provides for the retaining of lubricating material between the cross members of the retainer and the sides of the rollers.

It will also be seen from a further inspection of Figure 9, that the portions 50 do not extend entirely across the length of the cross members 30 but extend for only a short distance at each end of each cross member, the central portion of the cross member being cut down to the straight side portion 43. This construction, while effectively retaining the roller within the retainer, eliminates a considerable amount of friction which would be caused by extending the portions 50 the entire length of the cross member 40.

From this description it will be seen that in the second form of the invention herein illustrated, I have provided a roller bearing in which the rollers are permanently retained in a suitable retaining member, and the retainer with the rollers therein may be marketed and handled as a unit independent of any other elements of the bearing, and in which suitable lubricating means is provided for the rollers. In combination with the race members and thrust rings, I have also provided a bearing that is easy to assemble, is economical to manufacture and which will take up side thrusts as well as the journal load to which a bearing of this class is usually subjected.

While I have shown two embodiments of my invention, it is to be understood that formal changes and changes relating to details of construction and manufacture may be resorted to without departing from the spirit and substance of my invention, the scope of which is commensurate with the appended claims.

What I claim is:

1. A roller bearing comprising, spaced inner and outer race members, a plurality of rollers positioned therebetween, and a cast retainer for said rollers comprising side rings and integral spacing bars therebetween, said bars having curved faces formed with radii shorter than the radii of said rollers terminating in flanged extensions to provide oil pockets and to prevent removal of said rollers inwardly between said bars, oil absorbing material in said pockets, grooves formed in the outer faces of said spacing bars and side rings, and second grooves formed in said spacing bars transversely of and of less depth than said first grooves to permit the free edges of said bars to be pressed toward said rollers to prevent removal of the latter outwardly between said bars.

2. A roller bearing comprising, spaced inner and outer bearing rings, a plurality of spaced rollers positioned therebetween, and a retainer for said rollers comprising integral side rings and spacing bars therebetween positioned between said rollers, said bars having curved faces formed with radii shorter than the radii of said rollers terminating in flanged extensions to provide oil pockets and to prevent removal of the rollers inwardly between said bars, grooves formed in the outer faces of said spacing bars and continuing through said side rings, and second grooves transversely of and of less depth than said first grooves formed in said spacing bars adjacent to said side rings to permit the free edges of said bars to be pressed toward said rollers to prevent removal of the latter from said retainer outwardly between said bars.

KARL L. HERRMANN.